(12) United States Patent
Peacock

(10) Patent No.: US 7,075,538 B2
(45) Date of Patent: Jul. 11, 2006

(54) METHODS AND APPARATUS FOR FASTER LINE DRAWING ON REMOTE DISPLAYS

(75) Inventor: John Kent Peacock, Menlo Park, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 446 days.

(21) Appl. No.: 10/233,271

(22) Filed: Aug. 30, 2002
(Under 37 CFR 1.47)

(65) Prior Publication Data
US 2004/0041810 A1  Mar. 4, 2004

(51) Int. Cl.
*G06T 11/20* (2006.01)
(52) U.S. Cl. .................. 345/441; 345/470; 709/203
(58) Field of Classification Search ........ 345/441–443, 345/648, 689, 470, 748, 749, 545, 546, FOR. 214–217; 709/203, 218, 230; 715/744, 749, FOR. 185
See application file for complete search history.

(56) References Cited

U.S. PATENT DOCUMENTS

| | | | |
|---|---|---|---|
| 6,223,289 B1 | 4/2001 | Wall et al. | |
| 6,230,296 B1 | 5/2001 | Hanko et al. | |
| 6,798,420 B1* | 9/2004 | Xie | 345/554 |
| 2001/0048435 A1* | 12/2001 | Deering et al. | 345/441 |
| 2003/0063043 A1* | 4/2003 | Girard | 345/8 |

OTHER PUBLICATIONS

O'Reilly & Associates, X Protocol Reference Manual, 1995, O'Reilly & Associates Inc., vol. Zero, pp. 30-31.*
Virtual Network Computing by Tristan Richardson, Quentin Stafford-Fraser, Kenneth R. Wood and Andy Hopper; 1998 IEEE Reprint from IEEE Internet Computing vol 2, No. 1, Jan./Feb. 1998; pp. 33-38; 1089-7801/98; http://computer.org/internet; The Olivetti & Oracle Research Laboratory.

* cited by examiner

*Primary Examiner*—Matthew C. Bella
*Assistant Examiner*—G. F. Cunningham
(74) *Attorney, Agent, or Firm*—Martine Penilla & Gencarella, LLP

(57) ABSTRACT

The present invention provides methods and apparatus for a computer network system to provide compact and efficient representations of graphics commands on drawing/displaying lines, circles, etc. The methods and apparatus exploit the redundancies and/or relations of the information in drawing/displaying lines, circles, etc. and allow for fewer bytes and faster transmission rate (e.g., more graphics primitives per second) to a client tier (e.g., to a thin client appliance and/or a display on the desktop appliance). For example, one embodiment of the present invention uses commands that take advantage of the structure of spans created by drawing commands to send a base fill command, followed by fills whose locations and size are expressed as deltas with respect to each previous fill in the list. The deltas may comprise a difference between two commands, a difference between a command and another difference, a difference between two differences, and/or a plurality of differences. The differences and/or deltas may be determined by any number of relationships, such as additions and/or subtractions.

30 Claims, 6 Drawing Sheets

METHODS AND APPARATUS FOR FASTER LINE DRAWING ON REMOTE DISPLAYS

BACKGROUND OF THE INVENTION

1. Field of the Invention

The present invention relates to the field of data delivery in a computer network system and, in particular, to methods and apparatus for providing compact and efficient representations of graphics information that will allow fewer bytes and faster transmission rate.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

Sun, Sun Microsystems, the Sun logo, Sun Ray, Solaris and all Java-based trademarks and logos are trademarks or registered trademarks of Sun Microsystems, Inc. in the United States and other countries. All SPARC trademarks are used under license and are trademarks of SPARC International, Inc. in the United States and other countries. All X trademarks are used under license and are trademarks of X Consortium in the United States and other countries. The UNIX trademark is used under license and is a trademark of American Telephone and Telegraphy Company in the United States and other countries. Products bearing SPARC trademarks are based upon an architecture developed by Sun Microsystems, Inc.

2. Description of Related Art

The multi-tier application architecture includes at least a server tier and a client tier. Referring now to FIG. 1, the client tier 1000 communicates requests to the server tier 1100 for data, software and services, for example, and the server tier 1100 responds to the requests. The server tier's response may entail communication with a database management system for the storage and retrieval of data. The server tier 1100 typically includes a database server system 1110, an application server system 1120, and application logic 1130 (i.e., software application programs, functions, etc.). The application server system 1120 responds to application requests received from the client tier 1000. The application server system 1120 may also forward data requests from the client tier 1000 to the database server system 1110.

The client tier 1000 typically consists of a computer system that provides a graphic user interface (GUI) generated by a client application, such as a browser or other user interface application. Conventional browsers include Internet Explorer and Netscape Navigator, among others. The client application generates a display from, for example, a specification of GUI elements (e.g., a file containing input, form, and text elements defined using the Hypertext Markup Language (HTML)) and/or from an applet (i.e., a program such as a program written using the Java™ programming language, or other platform-independent programming language, that runs when it is loaded by the browser).

Further application functionality is provided by application logic 1130 managed by application server system 1120 in server tier 1100. The apportionment of application functionality between client tier 1000 and server tier 1100 is dependent upon whether a "thin client" or "thick client" topology is desired. In a thin client topology, the client tier 1000 (i.e., the end user's computer appliance or unit) is used primarily to display output and obtain input, while the computing takes place in the server tier 1100. A thick client topology, on the other hand, uses a more conventional general purpose computer having processing, memory, and data storage capabilities.

In a typical system, especially one using a thin client topology, elements of the client tier 1000 and server tier 1100 execute within separate computers interconnected over a network 1200 such as an Ethernet network, a LAN (local area network) and/or a WAN (wide area network). Because commands (e.g., graphics commands) on how and what to display on the client tier 1000 are running on the server tier 1100 and away from the client tier 1000, the server tier 1100 needs to generate the graphics commands and put them into network data packets that are sent over the network 1200 to the client tier 1000 (e.g., to the thin client appliance currently displaying the user session). This represents an extra step in getting the information (e.g., the graphics information) to the user on the client tier 1000 because the server tier 1100 is not just generating commands for a local graphics card. Thus, efficiently solving the problems associated with getting the information (e.g., the graphics information) to the user over the network 1200 to the client tier 1000 is important in providing satisfactory performance from the user's point of view. For example, considerable amount of network bandwidth is required in transmitting graphics information on drawing/displaying lines, circles, etc. from the server tier 1100 to the client tier 1000. Many of these information are redundant and/or related.

Accordingly, it would be advantageous and desirable for a computer network system to provide compact and efficient representations of graphics commands on drawing/displaying lines, circles, etc. that will allow fewer bytes and faster transmission rate (e.g., more graphics primitives per second). Furthermore, to provide the more compact and efficient representations, it would be advantageous and desirable to exploit the redundancies and/or relations of the information in drawings/displaying lines, circles, etc.

SUMMARY OF THE INVENTION

The present invention provides methods and apparatus for a computer network system to provide compact and efficient representations of graphics commands on drawing/displaying lines, circles, etc. The methods and apparatus exploit the redundancies and/or relations of the information in drawings/displaying lines, circles, etc. and allow for fewer bytes and faster transmission rate (e.g., more graphics primitives per second) to a client tier (e.g., to a thin client appliance and/or a display on the desktop appliance).

In one embodiment of the present invention, a computer network system includes a first data, a second data, a network, a first module for receiving the first and second data from the network, and a second module for transmitting the first and second data to the first module over the network. A display is within the first module. The display displays graphics based on the first and second data. A memory is coupled with the display. The memory stores the first and second data. The first data includes a first base graphics command and the second data is determined from a first difference between the first base graphics command and a second base graphics command. The second data may also be determined from a second difference between the first graphics command and the first difference and/or between a third base graphics command and the first difference.

In another embodiment of the present invention, a method is developed for efficiently transmitting display information in a computer network system. In this method, a first and second information is provided to a second module. A first difference is differentiated from the first and second information. The first information and the first difference are transmitted from the second module to a first module over a network. A display within the first module displays the graphics based on the first and second information.

Alternately, a method is developed that transmits a first command and a second command from a second module to a first module over a network. The first and second command is stored in a memory associated with a display within the first module. Graphics based on the first and second command are shown on the display. In addition, the first command includes a base command and the second command includes a delta command. The base command comprises a rectangular FILL command. The delta command is determined from a first difference between the first rectangular FILL command and a second rectangular FILL command. The delta command may also be further determined from a second difference between the first rectangular FILL command and the first difference and/or between a third rectangular FILL command and the first difference.

A more complete understanding of the present invention, as well as a realization of additional advantages and objects thereof, will be afforded to those skilled in the art by a consideration of the following detailed description of the embodiment. Reference will be made to the appended sheets of drawings which will be first described briefly.

BRIEF DESCRIPTION OF THE DRAWINGS

The drawings illustrate the design and utility of embodiments of the invention. The components in the drawings are not necessarily to scale; instead, emphasis is placed on illustrating the principles underlying the embodiment. Moreover, features, aspects and advantages of the present invention will become better understood with regard to the following description, appended claims and accompanying drawings where:

DETAILED DESCRIPTION OF THE INVENTION

The present invention provides methods and apparatus for a computer network system to provide compact and efficient representations of graphics commands on drawing/displaying lines, circles, etc. The methods and apparatus exploit the redundancies and/or relations of the information in drawing/displaying lines, circles, etc. and allow for fewer bytes and faster transmission rate (e.g., more graphics primitives per second) to a client tier (e.g., to a thin client appliance and/or a display on the desktop appliance).

Figure 1:
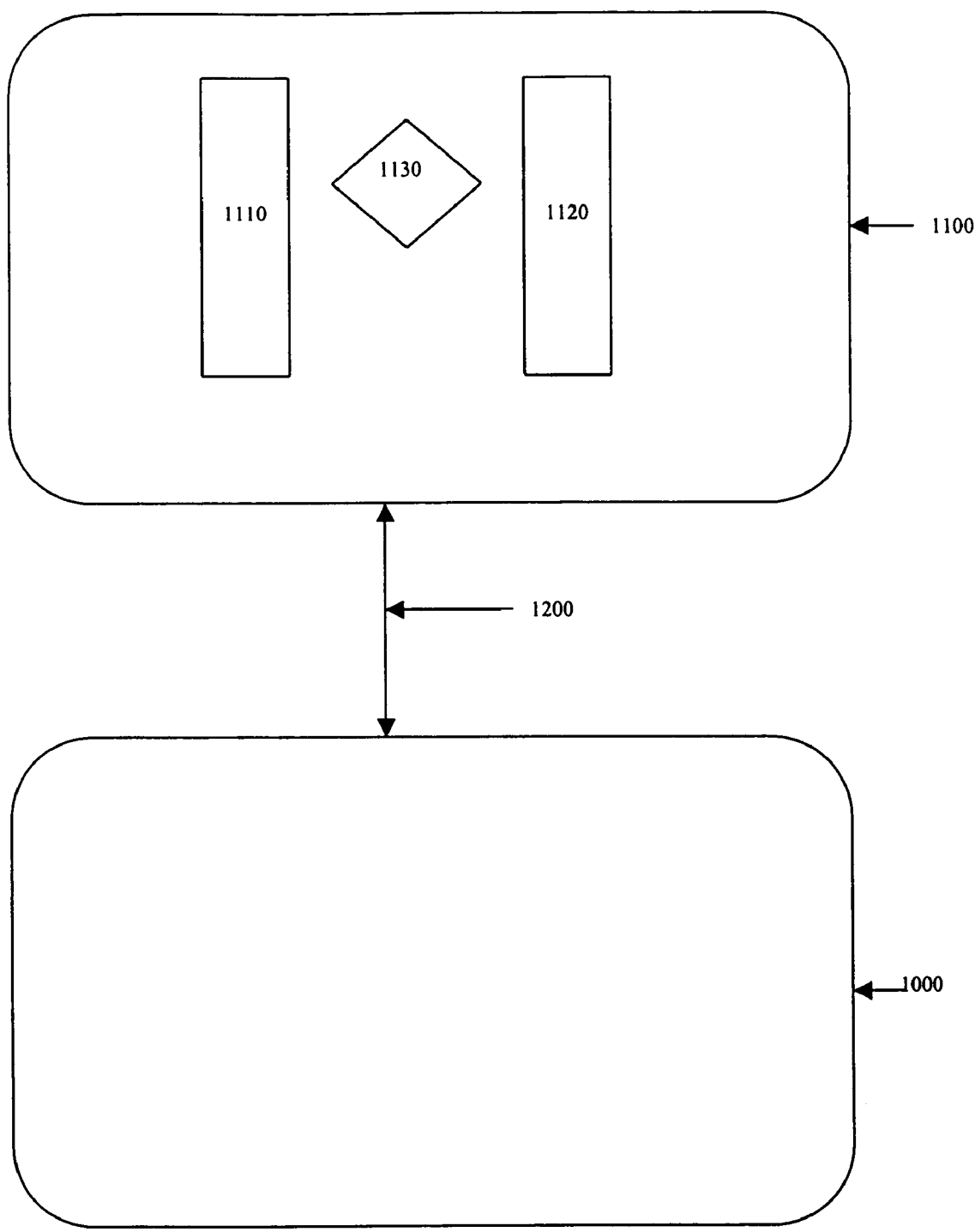
FIG. 1 is a block diagram of a computer network system wherein a server tier communicates with a client tier though a network.
Figure 2:
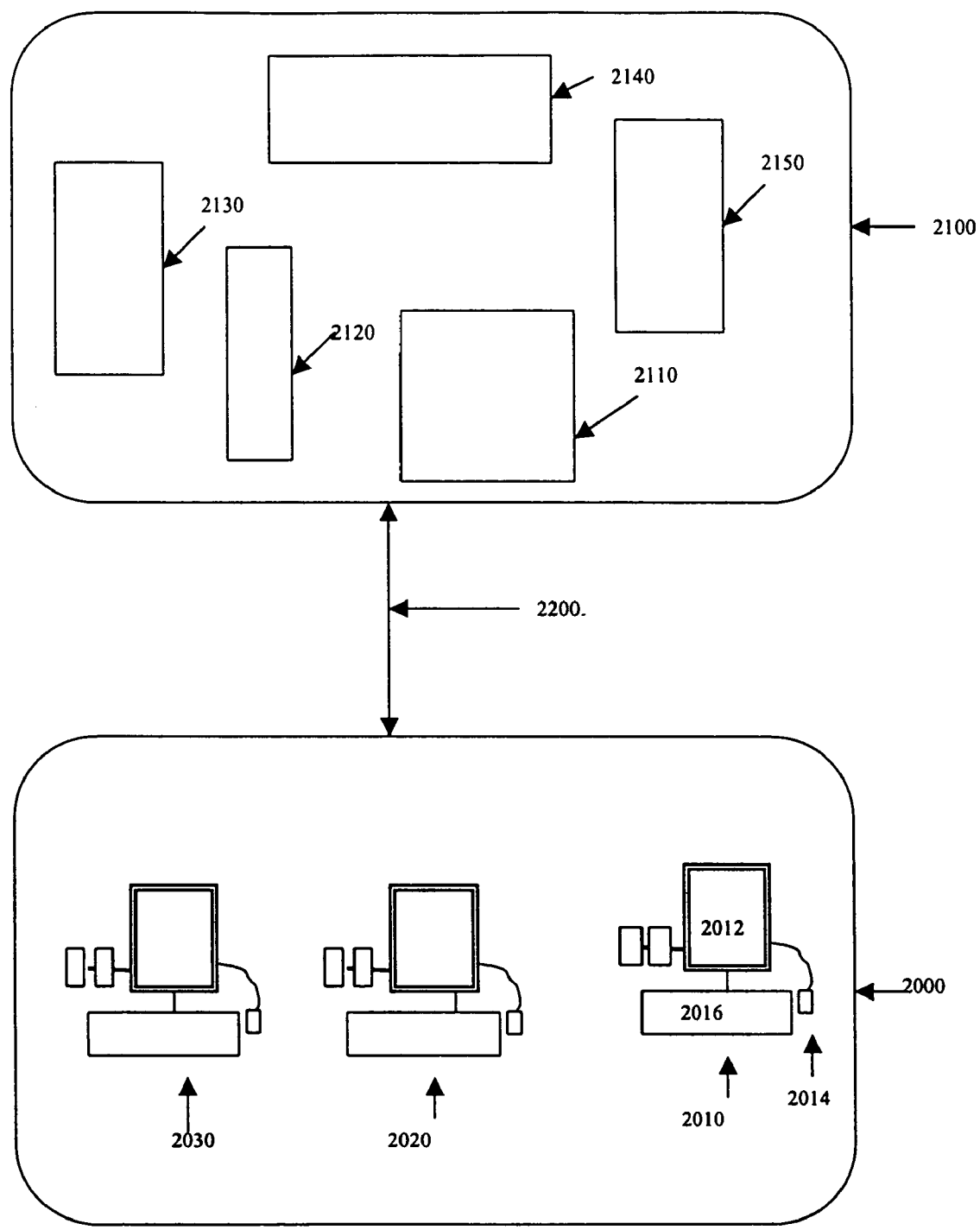
FIG. 2 is a block diagram of a computer network system wherein one or more server units communicate with one or more client units through a network, in accordance with one embodiment of the present invention.

Referring to FIG. 2, embodiments of the present invention can be implemented with at least one thin client appliance 2010, 2020, and/or 2030 in client tier 2000. A thin client appliance 2010, 2020, and/or 2030, such as a Sun Ray™ thin client appliance (or unit), is a small, stateless, "plug and work" desktop appliance whose main function is to process all input and output for the user and to manage communication with at least one server appliance (or unit) 2110, 2120, 2130, 2140, and/or 2150 in server tier 2100, such as a shared Sun Ray™ server appliance (or unit). All other computational tasks (or services) for the user are, for example, performed on the Sun Ray™ server, which is shared amongst a community of Sun Ray™ users.

The computational tasks (or services) include, for example, X11/UNIX® services, archived or live audio and video services, Windows NT service, Java™ program execution service, and others. As shown in FIG. 2, the computation tasks (or services) are not tied to a specific server appliance (or unit) 2110, 2120, 2130, 2140, and/or 2150 and may be distributed over one or more server appliances (or units) 2110, 2120, 2130, 2140, and/or 2150. In addition, one or more server appliances 2110, 2120, 2130, 2140, and/or 2150 may provide one or more services, or a service may be implemented by one or more server appliances 2110, 2120, 2130, 2140, and/or 2150.

A system using the thin client appliance 2010, 2020, and/or 2030, such as a Sun Ray™ enterprise system, replaces a traditional workstation system and provides the same user experience as the workstation, with no user state stored within the thin client appliance 2010, 2020, and/or 2030 (i.e., the desktop unit). This provides a unique capability called "hot desking" that allows a user to access their session from any thin client appliance 2010, 2020, and/or 2030 (or desktop unit) connected to the server tier 2100.

Referring still to FIG. 2, embodiments of the present invention can also be implemented with a server appliance 2110, 2120, 2130, 2140, and/or 2150, such as a Sun Ray™ server appliance, that provides access to the Solaris™ operating environment for a thin client unit 2010, 2020, and/or 2030, such as a Sun Ray™ thin client unit, connected to the server appliance 2110, 2120, 2130, 2140, and/or 2150. As with other UNIX® systems and/or Linux systems, for example, the display (e.g., 2012), the mouse (e.g., 2014), and the keyboard (e.g., 2016) in the thin client unit (e.g., 2010) can all be managed using a network operating extension system, such as the X Window System developed by the X Consortium.

The X Window System utilizes a protocol called X Protocol that provides a network transparent graphical user interface (GUI) primarily for the UNIX® operating system. The X Window System provides for the display and management of graphical information, much in the same manner as Microsoft's Windows and IBM's Presentation Manager. The key difference is in the structure of the X Protocol. Whereas Microsoft's Windows and Presentation Manager simply display graphical applications local to the personal computer (PC), the X Protocol distributes the processing of applications by specifying a client-server relationship at the application level. The what-to-do part of the application is called an X client application and is separated from the how-to-do part, the display, called the X server application. X client applications typically run on a server appliance (e.g., 2110, 2120, 2130, 2140, and/or 2150) and display on an X server application running on the same and/or another server appliance within the same network environment. The X client applications do not run on desktop units (e.g., 2010, 2020, and/or 2030). The application that is running on the desktop units (e.g., 2010, 2020, and/or 2030) is a software that takes the graphics commands over the network (e.g., 2200) from the X server application to create the display contents on the desktop units (e.g., 2010, 2020, and/or 2030).

The X server application translates X protocol commands from the X client application(s) into lower-level primitives that produce the desired result on the desktop unit's display (e.g., 2012), and that manage the processing of keyboard and mouse inputs. In the context of the present invention, a primitive is defined as a low-level object or operation from which higher-level, more complex objects and operations can be constructed. In graphics, primitives are basic elements, such as lines, curves, and polygons, which one can combine to create more complex graphical images. In programming, primitives are the basic operations supported by the programming language.

The X server application (i.e., its implementations) is also divided into a device-independent layer and a device-dependent layer, called the DDX driver. The DDX driver translates the device-independent graphics operations passed down from the device-independent layer into operations suitable for a specific graphics device, typically a graphics card incorporated into a PC, a workstation and/or the desktop units 2010, 2020, and/or 2030 shown in FIG. 2. Note: do not confuse the notion of an X client application sending X protocol commands to the X server application with the implementation of the Sun Ray™ protocol, which involves sending graphics primitives from the X server application to a thin client unit 2010, 2020, and/or 2030, such as the Sun Ray™ desktop unit. X client applications are software applications, such as a mail program or an internet browser, that generate graphical outputs that are to be displayed on a screen and that process user inputs. That is, the outputs on the screen come as the X protocol commands from X applications to the X server application.

Referring now still to FIG. 2, in an embodiment of the present invention (such as a embodiment implemented in a Sun Ray™ enterprise system), the X server application runs on a server appliance 2110, 2120, 2130, 2140, and/or 2150, and rather than generating commands for a local graphics card, the device-dependent part of the X server application generates graphics commands and puts them into network packets that are sent over the network 2200 to the desktop unit (e.g., 2010) currently displaying that user's session. This represents an extra step in getting the graphics information to the user over the network and through the desktop unit (e.g., 2010), so doing this extra step this efficiently is important in providing satisfactory performance from the user's point of view. An example of a protocol, specified as the "Wire Protocol," for performing this extra step is provided in Appendix A of U.S. Pat. No. 6,223,289. The aforementioned U.S. Pat. No. 6,223,289 is incorporated by reference herein in its entirety. Embodiments of the present invention can be implemented as extensions of this protocol. The extensions improve the performance in the transmission of certain graphics primitives, in particular, lines, circles, filled shapes, and some other graphic primitives. For example, considerable amount of network bandwidth is required in transmitting graphics commands on drawing/displaying lines, circles, etc. from the server tier (e.g., 2100) to the client tier (e.g., 2000). Many of the information in these graphics commands are redundant and/or related. Thus, to efficiently transmit the information (e.g., the graphics information) to the user over the network (e.g., 2200), the present invention exploits the redundancies and/or relations of the information in drawings/displaying lines, circles, etc. and allows for fewer bytes and faster transmission rate (e.g., more graphics primitives per second) to a client tier (e.g., 2000).

Embodiments of the present invention can be implemented with a thin client unit (e.g., 2010) that has a frame buffer. A frame buffer is logically a 2-dimensional memory array of pixel values representing what is being shown on the display device monitor (e.g., 2012). A server application (such as the X server application running on a server unit 2110, 2120, 2130, 2140, and/or 2150) keeps a copy of the frame buffer contents within itself (e.g., in a second frame buffer within the server tier 2100). The sever application can resend data to the thin client unit (e.g., 2010) to recreate screen contents on the thin client unit. As a result of this, it is possible to power cycle the remote thin client unit (e.g., 2010), and on rebooting, the server application will send the entire screen contents to the thin client unit (e.g., 2010), and so no display contents and/or computational state are lost.

Various forms of compression can be used to reduce the bandwidth requirements over a network (e.g., 2200) for sending changed pixel in the frame buffer. In an embodiment of the present invention (beside doing the various forms of compression in a timely manner), the compression forms used are a result of knowledge of the type of graphics primitives that are rendering the pixel values. For example, in drawing/displaying lines, circles, etc., solid areas of one color, for instance, are sent as a single FILL command that sets a rectangular region to one color. Areas that contain two colors are sometimes rendered using a BILEVEL command, which converts the 24-bit pixels into a representation with 1 bit per pixel, 0 for one color, and 1 for the other, thus compressing by a factor of 24. Characters are rendered as GLYPH commands, which are similar to bilevels, but set the positions of a rectangular region with a "1" bit to the value of a single color sent in the command, leaving the positions with a "0" bit alone. Another important form of compression is the COPY command, which copies one region in the frame buffer (such as the Sun Ray™ frame buffer) to another. (There is also a frame buffer in the thin client unit, such as the Sun Ray™ thin client unit, which is intended to have the same contents as the one with the X server application.) This is important to give good performance in situations where windows are being scrolled up or down. When a low-bandwidth connection is detected, more aggressive compression can be attempted with an algorithm similar to the Lempel-Ziv 77 algorithm, which was written by J. Ziv and A. Lempel, A Universal Algorithm for Sequential Data Compression, IEEE Transactions on Information Theory, Vol. IT-23, No. 3, pp. 337–343, 1977 and is incorporated by reference herein. This creates <offset, length> pairs of numbers that allow portions of a region to be copied from a distance <offset> earlier in the region for <length> pixels. With a suitable encoding, an embodiment of the present invention can compress transmission data by a large factor, though it takes some central processing unit (CPU) time on the server unit (e.g., 2110, 2120, etc.) to do the compression. Thus, one embodiment of the present invention is suitable in low-bandwidth situations where the speed of updating the display is limited by transmission of data through the network (e.g., 2200), and hence the use of CPU time on the server unit does not degrade the user's perception of performance.

In another embodiment of the present invention, an intermediate form of data, called a "span," is generated as part of the process of rendering a graphics primitive (e.g., a line, a circle, or a filled shape) into pixels within a frame buffer and onto a display (e.g., 2012). A span is a horizontal set of adjacent pixels within one scan line of the display. A typical graphics primitive will cause one or more spans to be generated specifying which pixels are to be written. A span can be represented as a tuple that specifies its position, length, and color, namely <x, y, w, c>, where x, y are the coordinates within the 2-dimensional frame buffer of the left end of the span (i.e., the left end of a set of pixels), w is its width in pixels, and c is the color value to be assigned to the affected positions in the frame buffer (i.e., the color value to be assigned to the set of pixels).

Spans may also be used for performing clipping operations against a set of rectangular areas that represent the portion of a logical window that is currently visible on the display. Windows can be stacked on top of each other, so parts of one window can obscure another. The parts of a span that are obscured by a window on top of the window being drawn should not be written into the frame buffer, so the spans are "clipped" to fit within the unobscured area.

Figure 3:
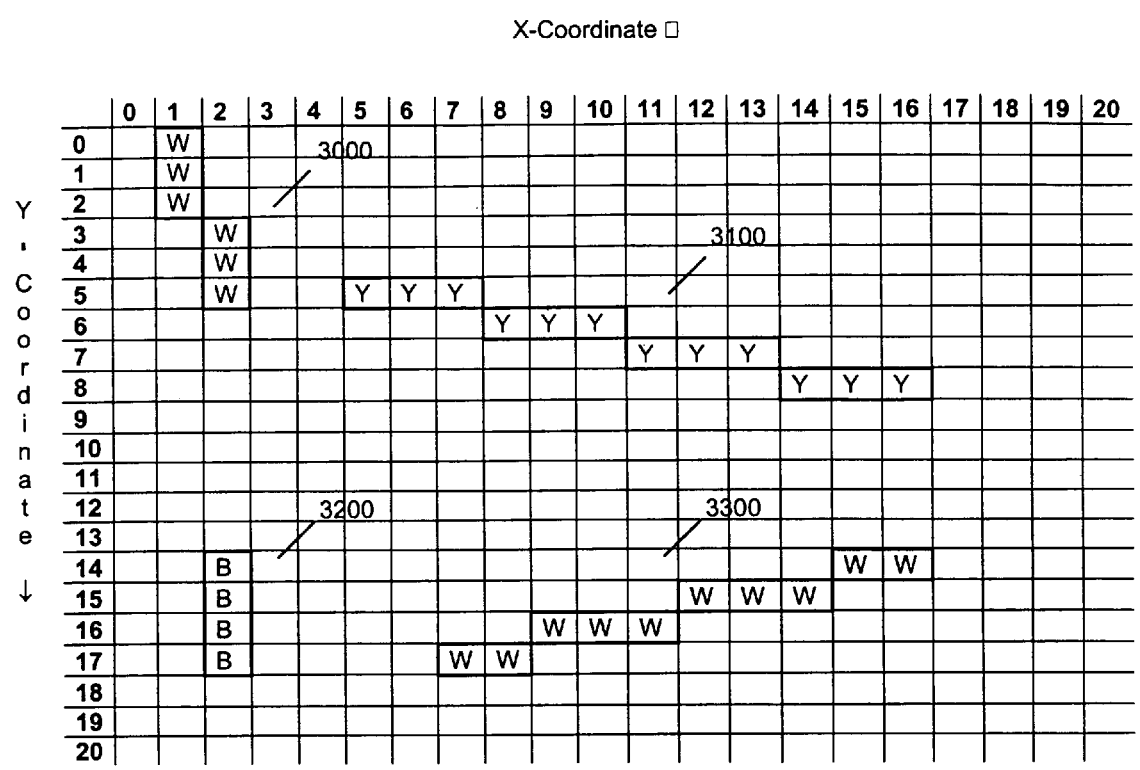
FIG. 3 is a diagram illustrating a raster and/or a frame buffer in accordance with one embodiment of the present invention.

The concept of spans is illustrated with some examples shown in FIG. 3. FIG. 3 represents a raster, showing the x,y coordinates, starting from the top left corner, and four line segments 3000, 3100, 3200, and 3300, respectively, going from (1,0) to (2,5), (5,5) to (16,8), (2,14) to (2,17), and (7,17) to (16,14). The letters in line segments 3000, 3100, 3200, and 3300 represent the color of the lines (for example, Y=yellow, B=blue, W=white). The tuple is just the set of numbers (and/or letters) that describe each span: the x, y coordinates of the left end, the number of pixels, and the color. The array shown in FIG. 3, could also be thought of as a representation of a 20×20 frame buffer, showing its contents, assuming that blank elements are colored black.

Referring still to the examples shown in FIG. 3, the spans generated in drawing line segments 3000, 3100, 3200, and 3300 would be, respectively, as follows:

(1,0)→(2,5)
   <1, 0, 1, W>
   <1, 1, 1, W>
   <1, 2, 1, W>
   <2, 3, 1, W>
   <2, 4, 1, W>
   <2, 5, 1, W>
(5,5)→(16,8)
   <5, 5, 3, Y>
   <8, 6, 3, Y>
   <11, 7, 3, Y>
   <14, 8, 3, Y>
(2,14)→(2,17)
   <2, 14, 1, B>
   <2, 15, 1, B>
   <2, 16, 1, B>
   <2, 17, 1, B>
(7,17)→(16,14)
   <7, 17, 2, W>
   <9, 16, 3, W>
   <12, 15, 3, W>
   <15, 14, 2, W>

In a conventional graphics transmission protocol, the horizontal spans may be turned into rectangular FILL commands (or fills) and sent to the remote device to be displayed. These fills are each represented by 5 tuples, <x,y,w,h,c>, which are like the spans shown above, except for the addition of h, which is the height of the rectangle. Vertically adjacent spans of the same width are combined into a larger rectangular area. The above line segments 3000, 3100, 3200, 3300, will thus be rendered as the following fills (Notice the combining of vertically adjacent spans that are 1-pixel wide):

(1,0)→(2,5)
   FILL <1, 0, 1, 3, W>
   FILL <2, 3, 1, 3, W>
(5,5)→(16,8)
   FILL <5, 5, 3, 1, Y>
   FILL <8, 6, 3, 1, Y>
   FILL <11, 7, 3, 1, Y>
   FILL <14, 8, 3, 1, Y>
(2,14)→(2,17)
   FILL <2, 14, 1, 4, B>
(7,17)→(16,14)
   FILL <7, 17, 2, 1, W>
   FILL <9, 16, 3, 1, W>
   FILL <12, 15, 3, 1, W>
   FILL <15, 14, 2, 1, W>

Each fill in the protocol is a 16-byte command that includes 4 bytes of command, 4 bytes of color, and 2 bytes each for x, y, w, and h. This 16-byte command has a very high overhead for situations where many of these fills modify only a few pixels. Especially, in client applications (e.g., X client applications) that generate a lot of line drawings. Accordingly, embodiments of the present invention provide apparatus and methods that seek to reduce the bytes used by encoding the spans and/or fills generated for a graphics command in a more compact form.

In a simple embodiment, a simplification method is developed that would reduce the data (e.g. bytes) sent. The method combines fills from the same graphics command, so that in a new MULTI_FILL command, the command and color need only be specified once (i.e., the same 4 bytes of command and 4 bytes of color can be reused and/or not be actually transmitted). With 4 bytes of command, 4 bytes of color, 2 bytes of count for the number of fills that has been combined, and 2 bytes each for x, y, w, and h of each FILL, this would mean that a line segment (e.g., 3000, 3100, 3200, or 3300) could be sent as 10+8*S bytes, where S is the number of spans generated by the command, rather than 16*S bytes, which is what the above conventional protocol took. This embodiment gives an asymptotic improvement (for long lines) of 50% fewer bytes than need to be sent.

Though useful, a better embodiment of the present invention is developed that performs better than the above simple embodiment by exploiting redundancy and relationships between the FILL commands (or fills), in particular when the graphics primitive being encoded is a line. In the context of the present invention, it was discovered that the differences between x, y, w, and h between adjacent fills have patterns that can be taken advantage of to produce a smaller encoding scheme (e.g., less bytes). Considering the examples given below that list the differences between fill values:

|  | Differences |
|---|---|
| (1,0) -> (2,5) |  |
| FILL <1, 0, 1, 3, W> |  |
| FILL <2, 3, 1, 3, W> | 1, 3, 0, 0 |
| (5,5) -> (16,8) |  |
| FILL <5, 5, 3, 1, Y> |  |
| FILL <8, 6, 3, 1, Y> | 3, 1, 0, 0 |
| FILL <11, 7, 3, 1, Y> | 3, 1, 0, 0 |
| FILL <14, 8, 3, 1, Y> | 3, 1, 0, 0 |

-continued

| (7,17) -> (16,14) | Differences |
|---|---|
| FILL <7, 17, 2, 1, W> | |
| FILL <9, 16, 3, 1, W> | 2, −1, 1, 0 |
| FILL <12, 15, 3, 1, W> | 3, −1, 0, 0 |
| FILL <15, 14, 2, 1, W> | 3, −1, −1, 0 |

There are several things to note here: First, several of the difference values are 0s. This will allow the server tier (e.g., 2100) in a embodiment of the present invention to not send these values most of the time, as they will be implicit. Secondly, the differences are small, and can usually be encoded as 1 byte, rather than 2. Thirdly, note that the differences between x and y are related to the values of w and h in the first FILL command of each difference. Thus, taking a further appropriate difference will usually reduce these values to 0s as well. Fourthly, the differences are often repeated, as in the line (5,5)→(16,8). Lastly, it will often be the case that the most common values of the w or h differences will be −1, 0, or +1, as exhibited in the (7,17) →(16,14) line. Accordingly, one embodiment of the present invention makes use of all of these properties of the differences to produce an encoding routine that typically uses only 1 or 2 bytes per FILL, rather than the 8 and/or 16 bytes obtained using the simple or conventional embodiments shown above.

In operation, an embodiment of the present invention uses an encoding routine (e.g., a firmware) that is able to incorporate the above redundancies and/or relations within a remote display protocol, such as the Sun Ray™ remote display protocol, to reduce the bandwidth requirements for drawing/displaying lines by a factor of 9, filled circles by over a factor of 5, and increases the line drawing throughput by a factor of between 5 and 6.

Figure 4:
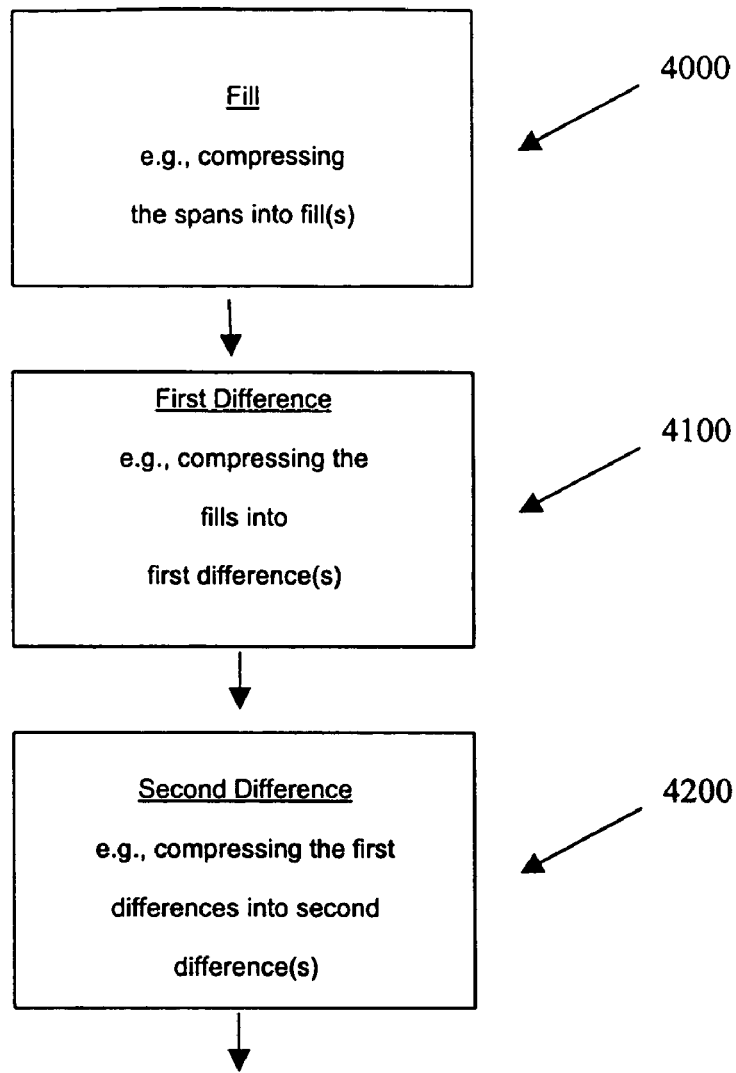
FIG. 4 is a flow diagram showing a routine on providing compact and efficient graphics command in accordance with one embodiment of the present invention.

In general according to the foregoing, an embodiment of the present invention provides a compression routine, as diagrammed in FIG. 4. The routine converts a series of fills 4000, such as FILL rectangles, produced by combining spans as described above, into a base FILL command followed by an encoded set of differences or deltas (e.g., 4100 and/or 4200) between the x, y, w, and h components of successive FILL rectangles in the series. For example, in one embodiment of the present invention, the encoded set of differences comprises a first difference or first differences and a second difference or second differences. The first difference or differences may be determined by differentiating two or more fills 4100. The second difference or differences may be determined by differentiating two or more first differences 4200.

Detailed specification of an exemplary encoding routine in accordance with one embodiment of the present invention is as follows, wherein each span is encoded as below. (Quantities enclosed in [ ] brackets are optional, and all values are 8-bit quantities.) Each FILL entry starts with a <CODE> byte that describes which difference values follow. For example,

```
<CODE> [<MODE>] [[<CNT_H>]<CNT_L>]
    [[<DX_H>]<DX_L>]
    [[<DY_H>]<DY_L>]
```

```
[[<DW_H>]<DH_L>]
[[<DH_H>]<DH_L>]
``` with quantities of interest computed, using "C" syntax:

```
cnt = <CNT_H> << 8 | <CNT_L>
dx = <DX_H> << 8 | <DX_L>
dy = <DY_H> << 8 | <DY_L>
dw = <DW_H> << 8 | <DW_L>
dh = <DH_H> << 8 | <DH_L>
``` with x, y, w, h representing current fill rectangle, where x, y=upper left corner, w=width, and h=height, and values not present are set to 0. Bits of <CODE> are interpreted as follows:

```
0000 0000: null difference (padding)
00xx xxxx: cnt = 0, implies <MODE> is present, and causes x = dx,
    y = dy, w = dw, h = dh and a fill of the base rectangle.
10xx xxxx: <CNT_L> follows
11xx xxxx: <CNT_H><CNT_L> follows
01xx xxxx: cnt = 1
0110 00yy: dw = yy − 1, all other differences are 0
0111 00yy: dh = yy − 1, all other differences are 0
xx0x 1xxx: <DX_L> is present
xx1x 1xxx: <DX_H><DX_L> are present
xx0x x1xx: <DY_L> is present
xx1x x1xx: <DY_H><DY_L> are present
xxx0 xx1x: <DW_L> is present
xxx1 xx1x: <DW_H><DW_L> are present
xxx0 xxx1: <DH_L> is present
xxx1 xxx1: <DH_H><DH_L> are present
```

Each parsed difference causes the dx, dy, dw, dh values to be added to x, y, w, h and fills to be performed, and repeated cnt (i.e., count) times.

In addition, if (MODE & 1) is non-zero, a special differencing mode is invoked which typically allows encoding 3 or 4 of the values in the routine as zero. This mode takes advantage of the properties of spans produced by line drawing, namely that successive spans abut and don't overlap. In particular, x and y are adjusted using the new or old values of w and h to be positioned at the start of the next span. For example, in a line drawn left to right, the new x value is just x+old w (or x+width), whereas in a line drawn right to left, the new x value is x−new w. If special adjustments for these relationships are applied, then the dx and dy values can be made to be zero. MODE is set according to the direction in which the original line was drawn. (MODE & 0x2)!=0 implies right to left and (MODE & 0x4)!=0 implies bottom to top.

As an illustration of the foregoing, consider the fills for the line segment 3100 from (5,5)→(16,8) above, with the following fills and differences:

| (5,5) -> (16,8) | Differences |
|---|---|
| FILL <5, 5, 3, 1, Y> | |
| FILL <8, 6, 3, 1, Y> | 3, 1, 0, 0 |

-continued

| (5,5) -> (16,8) | Differences |
|---|---|
| FILL <11, 7, 3, 1, Y> | 3, 1, 0, 0 |
| FILL <14, 8, 3, 1, Y> | 3, 1, 0, 0 |

Since the line segment 3100 goes from left to right and from top to bottom, the embodiment subtracts off old w's and old h's (emphasis in bold and underline) from the x and y differences, and the following new differences result:

| (5,5) -> (16,8) | Differences | New Differences |
|---|---|---|
| FILL <5, 5, 3, 1, Y> | | |
| FILL <8, 6, 3, 1, Y> | 3, 1, 0, 0 | 0, 0, 0, 0 |
| FILL <11, 7, 3, 1, Y> | 3, 1, 0, 0 | 0, 0, 0, 0 |
| FILL <14, 8, 3, 1, Y> | 3, 1, 0, 0 | 0, 0, 0, 0 |

The command to draw this line segment 3100 can be encoded in hexadecimal as:
  0f 01 05 05 03 01=DX_L, DY_L, DW_L, and DH_L present, mode=from left to right line, cnt=0 so base fill: x=5, y=5, w=3, h=1
  80 03=CNT_L follows, dx, dy, dw, dh all 0, cnt=3.

In addition, if this line segment 3100 is considered backwards, with the fills reversed, the difference and adjustment is to add the new w's and h's (emphasis in bold and underline):

| (16,8) -> (5,5) | Differences | New Differences |
|---|---|---|
| FILL <14, 8, 3, 1, Y> | | |
| FILL <11, 7, 3, 1, Y> | -3, -1, 0, 0, | 0, 0, 0, 0 |
| FILL <8, 6, 3, 1, Y> | -3, -1, 0, 0, | 0, 0, 0, 0 |
| FILL <5, 5, 3, 1, Y> | -3, -1, 0, 0, | 0, 0, 0, 0 |

This backward considering line segment 3100 is then similarly encoded in hexadecimal as:
  0f 07 0e 08 03 01=DX_L, DY_L, DW_L, and DH_L present, mode=from right to left, cnt=0 so base fill: x=14, y=8, w=3, h=1
  80 03=CNT_L follows, dx, dy, dw, dh all 0, cnt=3.

As a further refinement to the foregoing encoding routine for the treatment of a common special case, the 011000yy and 011100yy encodings above allow each difference of this type of line to be encoded as 1 byte, rather than 2, as −1, 0, +1 are the most common values of dw and dh. Consider the line segment 3300 (7,17)→(16,14) with the following differences and adjusted new differences, from the left to right direction (subtract old w's, emphasis in bold and underline, to the x differences and add new h's, emphasis in bold and underline, to the y differences):

| (7,17) -> (16,14) | Differences | New Differences |
|---|---|---|
| FILL <7, 17, 2, 1, W> | | |
| FILL <9, 16, 3, 1, W> | 2, -1, 1, 0 | 0, 0, 1, 0 |
| FILL <12, 15, 3, 1, W> | 3, -1, 0, 0 | 0, 0, 0, 0 |
| FILL <15, 14, 2, 1, W> | 3, -1, -1, 0 | 0, 0, -1, 0 |

This line segment 3300 is encoded as:
  0f 05 07 11 02 01=DX_L, DY_L, DW_L, and DH_L present, mode=from left to right line, cnt==0 so base fill: x=7, y=17, w=2, h=1
  62=special code: cnt=1, dw=+1, dx, dy, dh=0
  61=special code: cnt=1, dx, dy, dw, dh=0
  60=special code: cnt=1, dw=−1, dx, dy, dh=0

In terms of the efficiency obtained and accounting for the 10-byte fixed overhead, the first two examples (i.e., for drawing/displaying line segment 3100) take 10+8=18 bytes to encode, while the last example (i.e., for drawings/displaying line segment 3300) takes 10+9=19 bytes. The original FILL commands would take 16*4=64 bytes (i.e., 16*S and S is the number of spans), and the MULTI_FILL encodings would each take 10+8*4=42 bytes (i.e., 10+8*S). Thus, embodiments of the present invention provide considerable savings even with short lines. In drawing/displaying longer line, embodiments of the present invention can achieve even higher gains in efficiency.

In addition, in accordance with the foregoing, the above encoding routine can also be used for other graphics primitives, including circles and filled shapes, in which cases the special line mode encoding routine is not invoked. However, since the differences between components of the fills are usually small and will fit in one byte, the most that a typical fill using the above encoding routine would take is 10+5*S bytes. Thus, in drawings/displaying circles and/or filled shapes, embodiments of the present invention still provide a saving from the 10+8*S bytes required in a MULTI_FILL command.

Accordingly, based on the foregoing, embodiments of the present invention effectively provide compact and efficient representation of graphics commands on drawing/displaying lines, circles, etc.

Embodiments of the invention can be implemented as a thin client firmware within the client tier (e.g. 2000) and/or a server firmware within the server tier (e.g. 2100), as shown in the examples with pseudo-C code, respectively, at the end of this description section. Embodiments of the invention can also be implemented as computer software in the form of computer-readable program code executed in a general purpose computing environment; in the form of bytecode class files executable within a Java™ run time environment running in such an environment; in the form of bytecodes running on a processor (or devices enabled to process bytecodes) existing in a distributed environment (e.g., one or more processors on a network); as microprogrammed bit-slice hardware; as digital signal processors; or as hard-wired control logic.

Figure 5:
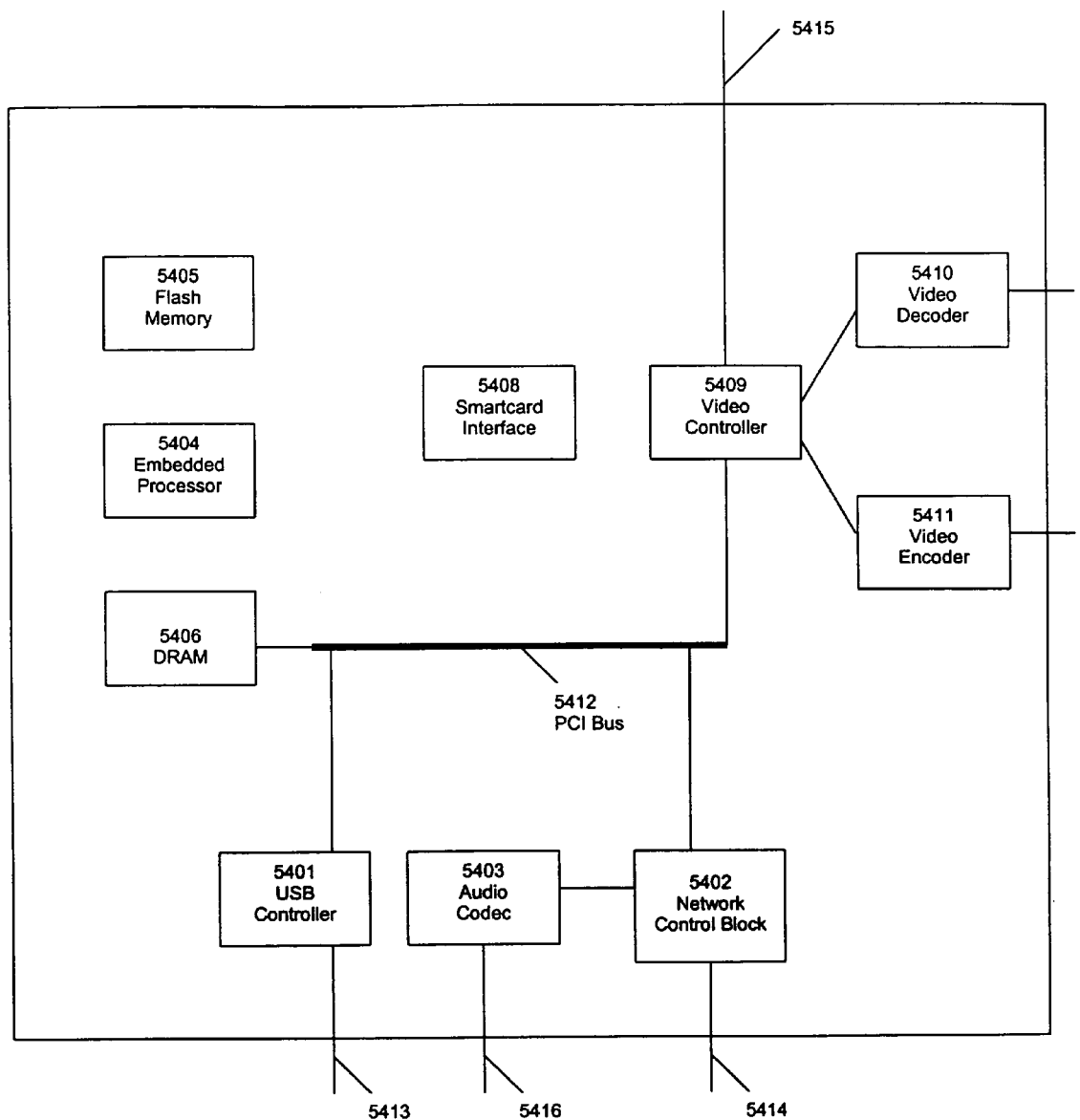
FIG. 5 is a block diagram of an example embodiment of the client unit in accordance with one embodiment of the present invention.

A block diagram of an example embodiment of a thin client unit appears as FIG. 5. The components of the thin client unit are coupled internally to a Peripheral Component Interface (PCI) bus 5412. Network control block 5402 communicates to the internal network, such as an Ethernet or intranet, through line 5414. An audio codec 5403 receives audio data on interface 5416 and is coupled to network control block 5402. Universal Serial Bus (USB) data communication is provided on lines 5413 to a USB controller 5401. The thin client unit further comprises an embedded processor 5404 such as a Sun Microsystems Sparc2ep with coupled flash memory 5405 and Dynamic Random Access Memory (DRAM) 5406. The USB controller 5401, the network control block 5402 and the embedded processor 5404 are all coupled to the PCI bus 5412. A video controller 5409, also coupled to the PCI bus 5412, can include an ATI RagePro+ frame buffer controller, which provides Super Video Graphic Array (SVGA) output on the line 5415.

National Television Standard Committee (NTSC) data is provided in and out of the video controller through video decoder 5410 and encoder 5411, respectively. A smartcard interface 5408 may also be coupled to the video controller 5409.

Figure 6:
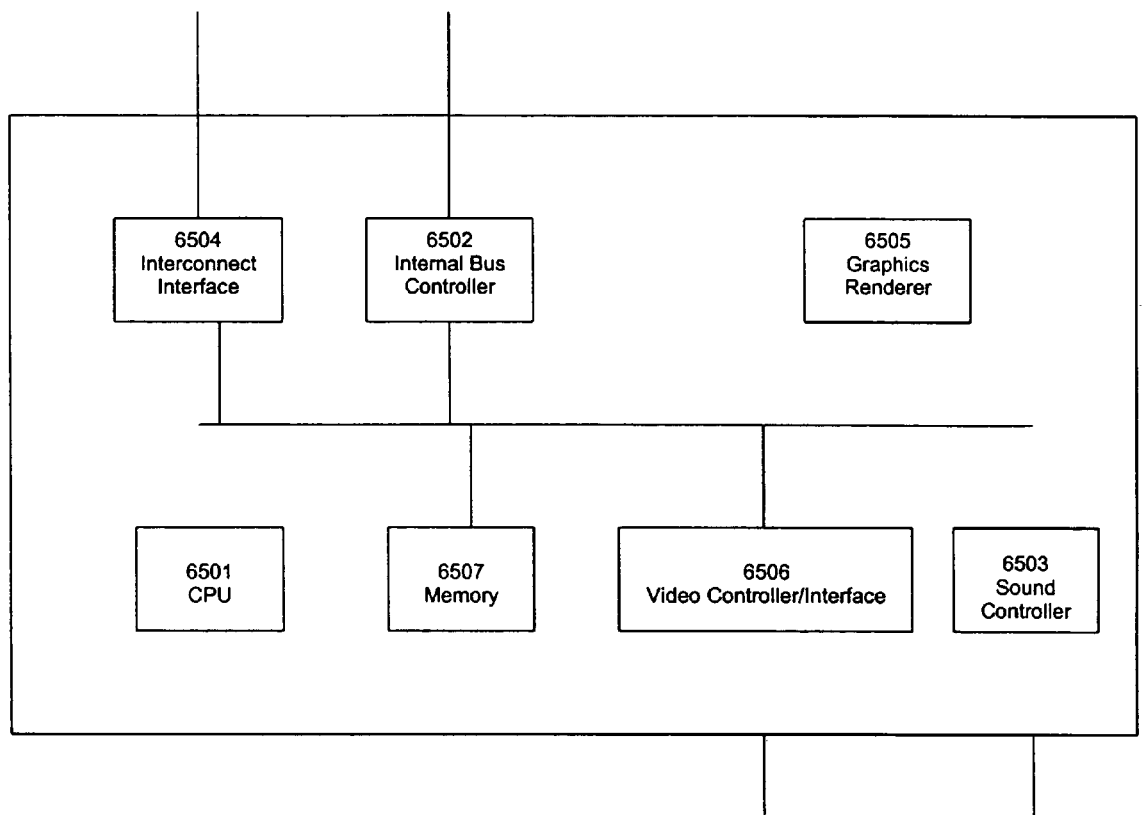
FIG. 6 is a block diagram of a single-chip implementation of a client unit in accordance with one embodiment of the present invention.

Alternatively, a thin client unit can comprise a single chip implementation, as illustrated in FIG. 6. The single chip includes the necessary processing capability implemented via CPU 6501 and graphics renderer 6505. Chip memory 6507 is provided along with video controller/interface 6506. An internal bus (e.g., USB) controller 6502 is provided to permit communication to a mouse, a keyboard and other local devices attached to the thin client unit. A sound controller 6503 and an interconnect interface 6504 are also provided. The video interface shares memory 6507 with the CPU 6501 and graphics renderer 6505. The firmware and/or software used in this embodiment may reside locally in non-volatile memory, and/or it can be loaded through the interconnection interface when the device is powered.

The computer systems described above are for purposes of example only. An embodiment of the invention may be implemented in any type of computer system or programming or processing environment.

Having thus described embodiments of the present invention, it should be apparent to those skilled in the art that certain advantages of this computer network system have been achieved. It should also be appreciated that various modifications, adaptations, and alternative embodiments thereof may be made within the scope and spirit of the present invention. For example, the transmission of information with a Sun Ray™ network computing system has been illustrated, but it should be apparent that the inventive concepts described above would be equally applicable to other types of system where display contents are generated on one computer and then transferred over a network to another computer and/or display device. The invention is further defined by the following claims.

The following is an exemplary thin client firmware with pseudo-C function code that may be implemented with a desktop unit (e.g., 2010) in accordance with an embodiment of the present invention:

```
/* <CODE> bit definitions */
#define CNT_PRESENT      0x80
#define CNT_HIGH         0x40
/* If CNT_PRESENT not set */
#define CNT_SHIFT        6
#define CNT_ONE          (1<<CNT_SHIFT)   /* 0x40 */
#define DXY_HIGH         0x20
#define DWH_HIGH         0x10
#define DX_PRESENT       0x08
#define DY_PRESENT       0x04
#define DW_PRESENT       0x02
#define DH_PRESENT       0x01
/* Special code values for lines */
#define SPEC_MASK        0xec
#define SPEC_CODE        0x60
#define SPEC_VALUE       0x03
#define SPEC_SETY        0x10
/* Bits definitions for <MODE> */
#define LINE_MODE        0x01      /* Zero-width line */
#define LINE_XMINUS      0x02      /* x decrements for successive spans */
#define LINE_YMINUS      0x04      /* y decrements for successive spans */
#define MAX_SPAN_BYTES 1400
/* Description of the N_SPANS command */
struct n_spans_cmd {
    unsigned long color;
    short   size;
    char    data[MAX_SPAN_BYTES];
};
/*
 * This function takes an N_SPANS command and converts it to the
 * appropriate FILLs and executes them.
 */
void
doSpans(struct n_spans_cmd *dp)
{
    int    x = 0, y = 0, w = 0, h = 0;
    int    next_dx = 0, next_dy = 0, next_dw = 0, next_dh = 0;
    short  cnt;
    char   *cp, *end;
    int    diffMode;
    SET_COLOR_REGISTER(dp->color);  /* Set color in graphics chip */
    cp = dp->data;
    end = cp + dp->size;
    diffMode = 0;
    cnt = 0;
    while (cp < end || cnt > 0) {
        int new_w, new_h, dx, dy;
        if (cnt == 0) {
            int  a, code;
            code = *cp++;
```

-continued

```
            if (code == 0) { /* Padding -> done */
                break;
            }
            next_dx = 0;
            next_dw = 0;
            next_dy = 0;
            next_dh = 0;
            /* Special cases dw or dh in -1, 0, +1; others 0 */
            if ((code & SPEC_MASK) == SPEC_CODE) {
                int t;
                t = (code & SPEC_VALUE) - 1;
                if (code & SPEC_SETY) {
                    next_dh = t;
                } else {
                    next_dw = t;
                }
                cnt = 1;
                goto done1;
            }
            if (code & CNT_PRESENT) {
                a = (unsigned char)*cp++;
                if (code & CNT_HIGH) {
                    a <<= 8;
                    a += (unsigned char)*cp++;
                }
                cnt = a;
            } else {
                a = (code & CNT_ONE) >> CNT_SHIFT;
                if (!a)
                    diffMode = *cp++
                cnt = a;
            }
            if (code & DX_PRESENT) {
                a = *cp++;
                if (code & DXY_HIGH) {
                    a <<= 8;
                    a += (unsigned char)*cp++;
                }
                next_dx = a;
            }
            if (code & DY_PRESENT) {
                a = *cp++;
                if (code & DXY_HIGH) {
                    a <<= 8;
                    a += (unsigned char)*cp++;
                }
                next_dy = a;
            }
            if (code & DW_PRESENT) {
                a = *cp++;
                if (code & DWH_HIGH) {
                    a <<= 8;
                    a += (unsigned char)*cp++;
                }
                next_dw = a;
            }
            if (code & DH_PRESENT) {
                a = *cp++;
                if (code & DWH_HIGH) {
                    a <<= 8;
                    a += (unsigned char)*cp++;
                }
                next_dh = a;
            }
            if (cnt == 0) {
                w = next_dw;
                h = next_dh;
            }
        }
    }
done1:
    if (cnt > 0) {
        dx = next_dx;
        dy = next_dy;
```

```
            new_w = w + next_dw;
            new_h = h + next_dh;
            if (diffMode & LINE_MODE) {
                if (diffMode & LINE_XMINUS) {
                    dx -= new_w;
                } else {
                    dx += w;
                }
                if (diffMode & LINE_YMINUS) {
                    dy -= new_h;
                } else {
                    dy += h;
                }
            }
            x += dx;
            y += dy;
            w = new_w;
            h = new_h;
            cnt--;
        }
        DO_GRAPHICS_FILL(x, y, w, h);   /* Execute the graphics fill */
    }
}
```

The following is an exemplary server firmware with pseudo-C function code that shows at a high level what happens at the server tier (e.g., 2100) in accordance to an embodiment of the present invention:

```
/* <CODE> bit definitions */
#define CNT_PRESENT      0x80
#define CNT_HIGH         0x40
/* If CNT_PRESENT not set */
#define CNT_SHIFT        6
#define CNT_ONE          (1<<CNT_SHIFT)  /* 0x40 */
#define DXY_HIGH    0x20     /* Indicate x and y are two bytes */
#define DWH_HIGH    0x10     /* Indicate w and h are two bytes */
#define DX_PRESENT  0x08
#define DY_PRESENT  0x04
#define DW_PRESENT  0x02
#define DH_PRESENT  0x01
/* Special code values for lines with dw or dh in -1, 0, +1 */
#define SPEC_MASK    0xec
#define SPEC_CODE    0x60
#define SPEC_VALUE   0x03
#define SPEC_SETY    0x10
/* Bits definitions for <MODE> */
#define LINE_MODE       0x01    /* Zero-width line */
#define LINE_XMINUS     0x02    /* x decrements for successive spans */
#define LINE_YMINUS     0x04    /* y decrements for successive spans */
typedef struct {
    short   x, y, w, h;
} FILL;
FILL   LastDiffs, PreviousFill, Diffs;
int diffcnt;
int diffMode;
#define MAX_SPAN_BYTES 1400
/* Buffer for building up the N_SPANS command */
struct n_spans_cmd {
    unsigned long color;
    short   size;
    char    data[MAX_SPAN_BYTES];
} spans_cmd;
/*
 * This function actually performs the encoding of the dx, dy, dw, dh
 * values for the next FILL. cnt == 0 implies this is the first FILL.
 * The return value from here is assigned to diffcnt.
 */
int
diffEncode(int cnt, FILL *d, int flush, int mode)
{
    char *cp, *svcp;
    int code, size, osize, v;
```

-continued

```
        osize = span_cmd.size;
        cp = &span_cmd.data[span_cmd.size];
        svcp = cp++;         /* Save the location for <CODE> */
        /* Encode the count */
        if (cnt <= 1) {
            code = cnt << CNT_SHIFT;
                if (cnt == 0)                    /* Base fill */
                    *cp++ = mode;
                else if (d->x == 0 && d->y == 0) {    /* Line mode? */
                    unsigned t;
                    /* Use special 1-byte codes, if possible */
                    t = (unsigned)(d->w + 1);
                    if (d->h == 0 && t < 3) {
                        code = SPEC_CODE + t;
                        goto done;
                    }
                    t = (unsigned)(d->h + 1);
                    if (d->w == 0 && t < 3) {
                        code = (SPEC_CODE | SPEC_SETY) + t;
                        goto done;
                    }
                }
        } else {
            code = CNT_PRESENT;
            if (cnt > 255) {
                *cp++ = (cnt >> 8);
                code |= CNT_HIGH;
            }
            *cp++ = cnt;
        }
        /*
         * If either x or y is outside the range, both must be sent
         * as 2 bytes.
         */
        if (d->x > 127 || d->x < -127 || d->y > 127 || d->y < -127)
            code |= DXY_HIGH;
        /* Similarly for w and h */
        if (d->w > 127 || d->w < -127 || d->h > 127 || d->h < -127)
            code |= DWH_HIGH;
        /* Only send values that are non-zero */
        if (v = d->x) {
            if (code & DXY_HIGH)
                *cp++ = (v >> 8);
            *cp++ = v;
            code |= DX_PRESENT;
        }
        if (v = d->y) {
            if (code & DXY_HIGH)
                *cp++ = (v >> 8);
            *cp++ = v;
            code |= DY_PRESENT;
        }
        if (v = d->w) {
            if (code & DWH_HIGH)
                *cp++ = (v >> 8);
            *cp++ = v;
            code |= DW_PRESENT;
        }
        if (v = d->h) {
            if (code & DWH_HIGH)
                *cp++ = (v >> 8);
            *cp++ = v;
            code |= DH_PRESENT;
        }
    done:
        *svcp = code;            /* Store <CODE> at start of this FILL */
        size = (cp - span_cmd.data);
        span_cmd.size = size;    /* Set new size of command */
        /* If told to flush, or out of space */
        if (flush || size > sizeof (span_cmd.data) -16) {
            sendCommand(N_FILL,&span_cmd,size); /* Send the span command */
            span_cmd.size = 0;
            return (0);          /* Force next call to be a base fill */
        } else
            return (1);          /* Have a fill plus one difference */
}
```

-continued

```
/* Called to process a single FILL */
void
outputFill(FILL *next, long color)
{
    /* First time in */
    if (diffcnt == -1) {
        PreviousFill = *next;       /* Save the base fill */
        span_cmd.color = color;     /* Save the color */
        diffcnt = 0;
        diffMode = 0;
        return;
    }
    /* Compute diffs with previous fill */
    Diffs.x = next->x - PreviousFill.x;
    Diffs.y = next->y - PreviousFill.y;
    Diffs.w = next->w - PreviousFill.w;
    Diffs.h = next->h - PreviousFill.h;
    if (diffMode & LINE_MODE) {     /* Zero-width line? */
            /* Adjust diffs so that they should be 0 */
            if (diffMode & LINE_XMINUS) {
                Diffs.x += next->w;     /* Add new w */
            } else {
                Diffs.x -= PreviousFill.w; /* Subtract old w */
            }
            if (diffMode & LINE_YMINUS) {
                Diffs.y += next->h;     /* Add new h */
            } else {
                Diffs.y -= PreviousFill.h; /* Subtract old h */
            }
    }
    /* If diffs are the same as previous ones, increment the count */
    if (Diffs.x == LastDiffs.x && Diffs.y == LastDiffs.y &&
        Diffs.w == LastDiffs.w && Diffs.h == LastDiffs.h) {
        diffcnt++;
    } else {
        if (diffcnt == 0) {     /* Base fill */
            /*
             * Check for a line. These tests are true if
             * the FILLs abut and don't overlap.
             */
            if ((Diffs.x == -next->w || Diffs.x == PreviousFill.w) &&
                (Diffs.y == -next->h || Diffs.y == PreviousFill.h)) {
                diffMode = LINE_MODE;
                if (Diffs.x < 0) {
                    diffMode |= LINE_XMINUS;
                    Diffs.x += next->w;
                } else {
                    Diffs.x -= PreviousFill.w;
                }
                if (Diffs.y < 0) {
                    diffMode |= LINE_YMINUS;
                    Diffs.y += next->h;
                } else {
                    Diffs.y -= PreviousFill.h;
                }
            } else {
                diffMode = 0; /* Not a line */
            }
            diffcnt = diffEncode(diffcnt, &PreviousFill, 0, diffMode);
        } else {    /* New diff, output previous one */
            diffcnt = diffEncode(diffcnt, &LastDiffs, 0, diffMode);
        }
    }
    PreviousFill = *next;       /* Assign current fill to Previous Fill */
    LastDiffs = Diffs;          /* Save Diffs in LastDiffs */
}
/*
 * This function takes a list of FILLs and converts them into the
 * target encoding.
 */
outputFills(FILL *fillList, int n, long color)
{
    diffcnt = -1;               /* No base fill yet */
    LastDiffs.x = 0;
    LastDiffs.y = 0;
```

-continued

```
    LastDiffs.w = 0;
    LastDiffs.h = 0;
    for (i = 0; i < n; i++) {      /* For each FILL in the list */
        outputFill(fillList[i], color);
    }
    /* Flush last differences or a fill */
    if (diffcnt > 0) {
        (void)diffEncode(diffcnt, &LastDiffs, 1, diffMode);
    } else if (diffcnt == 0) {
        fillCmd(PreviousFill, color);          /* Do a FILL command */
    }
}
```

The invention claimed is:

1. A computer network system for efficiently transmitting display information comprising:
 a first set of graphics data;
 a second set of graphics data;
 a first module for receiving said first and second sets of graphics data;
 a second module for transmitting said first and second sets of graphics data;
 a network for carrying said first and second sets of graphics data from said second module to said first module;
 a display within said first module for displaying graphics based on said first and second sets of graphics data; and
 a memory coupled with said display and having an amount of space available for storing said first and second sets of graphics data;
 wherein said first set of graphics data comprises a first graphics command and wherein said second set of graphics data is determined from a first difference between said first graphics command and a second graphics command.

2. The computer network system of claim 1, wherein said first and second sets of graphics data comprise information for drawing lines.

3. The computer network system of claim 1, wherein said first difference comprises a relationship between a plurality of graphics primitives.

4. The computer network system of claim 1, wherein said second set of graphics data is further determined from a second difference between said first graphics command and said first difference.

5. The computer network system of claim 1, wherein said second set of graphics data is further determined from a second difference between said first difference and a third graphics command.

6. The computer network system of claim 1, wherein said first graphics command comprises a plurality of tuples.

7. The computer network system of claim 6, wherein said plurality of tuples comprises at least four tuples.

8. The computer network system of claim 1, wherein each of said first and second sets of graphics data comprises information on a number of pixels to be displayed, information on a position of the pixels to be displayed, and information on a color of the pixels to be displayed.

9. The computer network system of claim 1, wherein said second set of graphics data may be implicitly transmitted by said second module and implicitly received by said first module.

10. The computer network system of claim 1, wherein said first module comprises a thin client computer and wherein said second module comprises a server computer.

11. The computer network system of claim 1, wherein said second module comprises a sever application for generating said first and second sets of graphics data.

12. The computer network system of claim 11, wherein said second module further comprises a second memory and wherein said server application keeps a copy of said first and second sets of graphics data on said second memory.

13. The computer network system of claim 11, wherein said first and second sets of graphics data can be retransmitted from said second module over said network to said first module.

14. The computer network system of claim 11, wherein said first and second sets of graphics data is transmitted from said second module over said network to said first module in the forms of data packets.

15. The computer network system of claim 14, wherein said second module further comprises a client application, wherein said client application sends a protocol command to said server application, and wherein said first and second sets of graphics data are generated from said protocol command.

16. The computer network system of claim 15, wherein said protocol command comprises an X protocol command.

17. The computer network system of claim 15, wherein said second module further comprises a first server computer and a second server computer, wherein said client application is running on said first server computer, and wherein said server application is running on said second server computer.

18. The computer network system of claim 14, wherein said first module comprises a graphics device and wherein said data packets are in a format suitable for said graphics device.

19. A method for efficiently transmitting display information in a computer network system comprising:
 providing a first set and a second set of graphics information to a second module;
 differentiating a first difference between said first set of graphics information and said second set of graphics information;
 transmitting said first set of graphics information from said second module over a network to a first module;
 transmitting said first difference from said second module over said network to said first module; and
 displaying graphics based on said first and second sets of graphics information on a display within said first module.

20. The method of claim 19, further comprising:
 providing a third set of graphics information to said second module;

differentiating a second difference between said second set of graphics information and said third set of graphics information;

transmitting said second difference from said second module over said network to said first module; and displaying graphics based on said third set of graphics information on said display.

21. The method of claim 20, wherein said first and second differences are only actually transmitted once from said second module to said first module, if said second difference is a repeat of said first difference.

22. The method of claim 19, wherein said first difference is transmitted as an one byte code.

23. The method of claim 19, wherein said first difference is only implicitly transmitted to said first module.

24. The method of claim 19, wherein each of said first and second sets of graphics information comprises information on a number of pixels to be displayed, information on a position of the pixels to be displayed, and information on a color of the pixels to be displayed.

25. The method of claim 24, wherein said differentiating said first difference comprises differentiating a relationship between said information on said number of the pixels to be displayed and said information on said position of the pixels to be displayed.

26. A method for efficiently transmitting display information in a computer network system comprising:

transmitting a first set of graphics data from a second module to a first module over a network;

transmitting a second set of graphics data from said second module to said first module over said network;

storing said first and second sets of graphics data on a memory associated with a display within said first module; and displaying graphics based on said first and second sets of graphics data on said display;

wherein said first set of graphics data comprises a graphics command and wherein said second set of graphics data comprises an encoded set of differences between said graphics command and successive graphics commands.

27. The method of claim 26, wherein said graphics command comprises a first rectangular FILL command.

28. The method of claim 26, wherein said encoded set of differences is determined from a first difference between said first rectangular FILL command and a second rectangular FILL command.

29. The method of claim 28, wherein said encoded set of differences is further determined from a second difference between said first rectangular command FILL command and said first difference.

30. The method of claim 28, wherein said encoded set of differences is further determined from a second difference between a third rectangular FILL command and said first difference.

* * * * *